United States Patent
Li et al.

(10) Patent No.: US 12,335,973 B2
(45) Date of Patent: *Jun. 17, 2025

(54) SIGNALING OF TRANSMISSIONS WITH SHORTENED TTI

(71) Applicant: Telefonaktiebolaget LM Ericsson (publ), Stockholm (SE)

(72) Inventors: Jingya Li, Gothenburg (SE); Laetitia Falconetti, Järfälla (SE); Henrik Sahlin, Mölnlycke (SE); Gustav Wikström, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/187,296

(22) Filed: Mar. 21, 2023

(65) Prior Publication Data

US 2023/0224922 A1    Jul. 13, 2023

Related U.S. Application Data

(63) Continuation of application No. 17/188,349, filed on Mar. 1, 2021, now Pat. No. 11,632,781, which is a
(Continued)

(51) Int. Cl.
*H04W 72/23*    (2023.01)
*H04L 1/1829*   (2023.01)
(Continued)

(52) U.S. Cl.
CPC .......... *H04W 72/23* (2023.01); *H04L 1/1854* (2013.01); *H04L 1/1861* (2013.01); *H04L 5/00* (2013.01);
(Continued)

(58) Field of Classification Search
CPC ................. H04W 72/23; H04W 72/21; H04W 72/232; H04W 72/1268; H04W 72/1273;
(Continued)

(56) References Cited

U.S. PATENT DOCUMENTS

2017/0223677 A1    8/2017   Dinan et al.
2017/0290004 A1    10/2017  Yang et al.
(Continued)

FOREIGN PATENT DOCUMENTS

WO    WO-2012173433 A2 *  12/2012  ........... H04L 1/1867
WO    WO-2013022272 A2 *  2/2013   ......... H04L 27/2633
(Continued)

OTHER PUBLICATIONS

International Search Report and Written Opinion dated Jan. 12, 2018 for International Application No. PCT/SE2017/050924 filed on Sep. 25, 2017, consisting of 17-pages.
(Continued)

*Primary Examiner* — Duc C Ho
(74) *Attorney, Agent, or Firm* — Weisberg I.P. Law, P.A.

(57) ABSTRACT

The disclosure relates to signalling of transmissions with shortened TTI. The disclosure further relates to an RBS and a method performed at the RBS of scheduling resources for a wireless communication device. The disclosure still further relates to a wireless communication device and a method performed at the wireless communication device of being granted data transmission or data reception. In a first aspect of the disclosure, a method performed at an RBS is provided for scheduling resources for a wireless communication device including indicating a grant of a resource for the wireless communication device to transmit or receive data based on DCI and a position of the DCI within a data frame of a downlink control channel.

20 Claims, 24 Drawing Sheets

Related U.S. Application Data continuation of application No. 16/333,158, filed as application No. PCT/SE2017/050924 on Sep. 25, 2017, now Pat. No. 10,980,053.

(60) Provisional application No. 62/402,513, filed on Sep. 30, 2016.

(51) Int. Cl.

| | |
|---|---|
| *H04L 5/00* | (2006.01) |
| *H04W 72/1268* | (2023.01) |
| *H04W 72/1273* | (2023.01) |
| *H04W 72/21* | (2023.01) |
| *H04W 72/232* | (2023.01) |
| *H04W 72/1263* | (2023.01) |

(52) U.S. Cl.
CPC .......... *H04L 5/0051* (2013.01); *H04L 5/0053* (2013.01); *H04W 72/1268* (2013.01); *H04W 72/1273* (2013.01); *H04W 72/21* (2023.01); *H04W 72/232* (2023.01); *H04W 72/1263* (2013.01)

(58) Field of Classification Search
CPC ............... H04W 72/163; H04L 1/1854; H04L 1/1861; H04L 5/00; H04L 5/0051; H04L 5/0053

See application file for complete search history.

(56) References Cited

U.S. PATENT DOCUMENTS

| | | | |
|---|---|---|---|
| 2017/0317794 | A1 | 11/2017 | You et al. |
| 2017/0332377 | A1 | 11/2017 | Tseng et al. |
| 2017/0332397 | A1* | 11/2017 | Li .................... H04L 1/1887 |
| 2018/0049235 | A1 | 2/2018 | Baghel et al. |
| 2018/0077719 | A1 | 3/2018 | Nory et al. |
| 2018/0098337 | A1 | 4/2018 | Lee et al. |

FOREIGN PATENT DOCUMENTS

| | | |
|---|---|---|
| WO | 2016142006 A1 | 9/2016 |
| WO | 2016142132 A1 | 9/2016 |
| WO | 2016142136 A1 | 9/2016 |
| WO | 2017076459 A1 | 5/2017 |
| WO | 2017116164 A1 | 7/2017 |
| WO | 2017172538 A1 | 10/2017 |

OTHER PUBLICATIONS

3GPP TSG RAN WG1 Meeting #83 R1-157148; Title: Physical layer aspects of TTI shortening for downlink transmissions; Source: Ericsson; Agenda Item: 6.2.9.2; Document for: Discussion and Decision; Location and Date: Anaheim, USA, Nov. 15-22, 2015, consisting of 5-pages.

3GPP TSG RAN WG1 Meeting #86 R1-166997; Title: Discussion on sPUSCH design for sTTI; Source: Spreadtrum Communications; Agenda Item: 7.2.12.2.1; Document for: Discussion and Decision; Location and Date: Gothenburg, Sweden, Aug. 22-26, 2016, consisting of 4-pages.

3GPP TSG RAN WG1 Meeting #83 R1-156461; Title: Control signaling enhancements for short TTI; Source: Huawei, HiSilicon; Agenda Item: 6.2.9.2; Document for: Discussion and decision; Location and Date: Anaheim, USA, Nov. 15-22, 2015, consisting of 6-pages.

3GPP TSG RAN WG1 Meeting #84 R1-160941; Title: DCI bit fields for short TTI uplink transmissions; Source: Ericsson; Agenda Item: 7.3.4.3; Document for: Discussion and Decision; Location and Date: Malta, Feb. 15-19, 2016, consisting of 4-pages.

3GPP TS 36.212 V14.0.0; 3rd Generation Partnership Project; Technical Specification Group Radio Access Network; Evolved Universal Terrestrial Radio Access (E-UTRA); Multiplexing and channel coding (Release 14); Sep. 2016, consisting of 148-pages.

European Examination Report dated Apr. 3, 2020 for European Patent Application No. 17856905.9, consisting of 9-pages.

Notice of Reasons for Rejection dated Mar. 17, 2020 for Japanese Patent Application No. 2019-516157, consisting of 4-pages.

Notice of Preliminary Rejection and English Translation, dated Feb. 27, 2020, for Korean Patent Application No. 2019-7008193, consisting of 9-pages.

3GPP TSG-RAN R1-167487; Title: sPDCCH search space design; Agenda Item: 7.2.12.2.1; Source: Ericsson Document for: Discussion , Decision; Location and Date: Gothenburg, Sweden, Aug. 22-26, 2016, consisting of 6-pages.

3GPP TSG RAN WG1 #84bis R1-163323; Title: Definition of DCI bit fields for short TTI; Source: Ericsson; Agenda tem: 7.3.10.2; Document for: Discussion and Decision; Location and Date: Busan, Apr. 11-15, 2016, consisting of 5-pages.

3GPP TSG RAN WG1 #84bis R1-163322; Title: Downlink control signaling design for short TTI; Source: Ericsson; Agenda Item: 7.3.10.2; Document for: Discussion and Decision; Location and Date: Busan, Apr. 11-15, 2016, consisting of 4-pages.

3GPP TSG RAN WG1 #83 R1-157148; Title: Physical layer aspects of TTI shortening for downlink transmissions; Source: Ericsson; Agenda Item: 6.2.9.2; Document for: Discussion and Decision; Location and Date: Anaheim, USA, Nov. 15-22, 2015, consisting of 5-pages.

3GPP TSG RAN WG1 #86 R1-166997; Title: Discussion on sPUSCH design for sTTI; Source: Spreadtrum Communications; Agenda Item: 7.2.12.2.1; Document for: Discussion and Decision; Location and Date: Gothenburg, Sweden, Aug. 22-26, 2016, consisting of 4-pages.

Chinese Notice of Allowance and English Translation of the Chinese Notice of Allowance dated Nov. 22, 2022 for Application No. 201780060836.2, consisting of 6 pages.

3GPP TSG RAN WG1 Meeting #71 R1-125142; Title: DCI signalling in DCI format 2D and fallback operation in TM10; Source: Sharp; Agenda Item: 6.2.2.3; Document for: Discussion and Decision; Date and Location: Nov. 12-16, 2012, New Orleans, US, consisting of 9 pages.

* cited by examiner

| Symbol index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| DL sTTI index | 0 | | | 1 | | 2 | | 3 | | 4 | | | 5 | |

DL sTTI 4 | 9 | 10 |
         |   | 4  | fast UL DCI bit field   sPUSCH pattern

0
| 9 | 10 |
|   | R  |

1
| 9  | 10 |
| R  |    |

2
| 9 | 10 |
|   |    |

3
| 10 | 11 |
| R  |    |

DL sTTI 5 | 11 | 12 | 13 |
          |    | 5  |    | fast UL DCI bit field   sPUSCH pattern

DL sTTI 0 | 0 | 1 | 2 |
         |   | 0 |   | fast UL DCI bit field     sPUSCH pattern

0

| 12 | 13 |
| R  |    |

1

| 12 | 13 |
|    |    |

2

| 7 | 8 | 9 | 10 |
|   |   |   | R  |

3

| 0 | 1 | 2 | 3 | 4 | 5 | 6 |
| R | R | R | R | R | R | R |

DL sTTI 1 | 3 | 4 |
          |   1   | fast UL DCI bit field     sPUSCH pattern

0

| 0 | 1 |
| R |   |

1

| 2 | 3 |
|   | R |

2

| 2 | 3 |
| R |   |

3

| 10 | 11 | 12 | 13 |
| R  |    |    |    |

DL sTTI 2 | 5 | 6 |
          |   2   | fast UL DCI bit field     sPUSCH pattern

0

| 2 | 3 |
|   |   |

1

| 3 | 4 |
| R |   |

2

| 4 | 5 | 6 |
| R |   |   |

3

| 4 | 5 | 6 |
|   |   |   |

Fig. 8

DL sTTI 3: 7, 8 / 3 fast UL DCI bit field | sPUSCH pattern

0 | 5, 6 / R

1 | 5, 6

2 | 0, 1, 2, 3 / R (under 3)

3 | 7, 8, 9, 10, 11, 12, 13 / R

DL sTTI 4: 9, 10 / 4 fast UL DCI bit field | sPUSCH pattern

0 | 7, 8 / R

1 | 9, 10 / R (under 10)

2 | 9, 10 / R

3 | 9, 10

DL sTTI 5: 11, 12, 13 / 5 fast UL DCI bit field | sPUSCH pattern

| Symbol index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| DL sTTI index | 0 | | | 1 | | 2 | | 3 | | 4 | | 5 | | |

Fig. 14

| DL sTTI 1 | 3 | 4 |
|---|---|---|
| | 1 | | fast UL DCI bit field — sPUSCH pattern

0:
| 2 | 3 |
|---|---|
| R | |

1:
| 2 | 3 | 4 |
|---|---|---|
| R | | |

2:
| 3 | 4 | 5 | 6 |
|---|---|---|---|
| R | | R | |

3:
| 0 | 1 | 2 | 3 | 4 | 5 | 6 |
|---|---|---|---|---|---|---|
| | | R | | | R | |

| DL sTTI 2 | 5 | 6 |
|---|---|---|
| | 2 | | fast UL DCI bit field — sPUSCH pattern

0:
| 5 | 6 |
|---|---|
| R | |

1:
| 4 | 5 | 6 |
|---|---|---|
| R | | |

2:
| 3 | 4 | 5 | 6 |
|---|---|---|---|
| R | | R | |

3:
| 0 | 1 | 2 | 3 | 4 | 5 | 6 |
|---|---|---|---|---|---|---|
| | | R | | | R | |

| DL sTTI 3 | 7 | 8 |
|---|---|---|
| | 3 | | fast UL DCI bit field — sPUSCH pattern

DL sTTI 4: | 9 | 10 |
         | 4 | fast UL DCI bit field — sPUSCH pattern

0:
| 9 | 10 |
| R |    |

1:
| 9 | 10 | 11 |
| R |    |    |

2:
| 7 | 8 | 9 | 10 |
| R |   |   | R  |

3:
| 7 | 8 | 9 | 10 | 11 | 12 | 13 |
| R |   |   | R  |    |    |    |

DL sTTI 5: | 11 | 12 | 13 |
           |      5      | fast UL DCI bit field — sPUSCH pattern

SIGNALING OF TRANSMISSIONS WITH SHORTENED TTI

CROSS-REFERENCE TO RELATED APPLICATIONS

This is a Continuation Application of U.S. application Ser. No. 17/188,349 filed Mar. 1, 2021, which is a Continuation Application of U.S. application Ser. No. 16/333,158 filed Mar. 13, 2019, which is a Submission Under 35 U.S.C. § 371 for U.S. National Stage Patent Application of International Application No.: PCT/SE2017/050924, filed Sep. 25, 2017 entitled "SIGNALING OF TRANSMISSIONS WITH SHORTENED TTI," which claims priority to U.S. Provisional Application No.: 62/402,513, filed Sep. 30, 2016, entitled "SIGNALING OF UPLINK TRANSMISSIONS WITH SHORTENED TTI," the entireties of all of which are incorporated herein by reference.

TECHNICAL FIELD

The disclosure relates to signalling of transmissions with shortened transmission time interval (TTI). The disclosure further relates to a Radio Base Station (RBS) and a method performed at the RBS of scheduling resources for a wireless communication device. The disclosure still further relates to a wireless communication device and a method performed at the wireless communication device of being granted data transmission or data reception.

BACKGROUND

Latency Reduction with Short Subframes

Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Shorter latency than previous generations of 3rd Generation Partnership Projec (3GPP) Radio Access Technologies (RATs) was one performance metric that guided the design of Long Term Evolution (LTE). LTE is also now recognized by the end-users to be a system that provides faster access to internet and lower data latencies than previous generations of mobile radio technologies.

Packet data latency is important not only for the perceived responsiveness of the system; it is also a parameter that indirectly influences the throughput of the system.

The Hypertext Transfer Protocol/Transmission Control Protocol (HTTP/TCP) is the dominating application and transport layer protocol suite used on the internet today. According to HTTP Archive (http://httparchive.org/trends.php) the typical size of HTTP based transactions over the internet are in the range of a few 10's of Kbyte up to 1 Mbyte. In this size range, the TCP slow start period is a significant part of the total transport period of the packet stream. During TCP slow start the performance is latency limited. Hence, improved latency can rather easily be showed to improve the average throughput, for this type of TCP based data transactions.

Radio resource efficiency could be positively impacted by latency reductions. Lower packet data latency could increase the number of transmissions possible within a certain delay bound; hence higher Block Error Rate (BLER) targets could be used for the data transmissions freeing up radio resources potentially improving the capacity of the system.

One area to address when it comes to packet latency reductions is the reduction of transport time of data and control signalling, by addressing the length of a transmission time interval (TTI). In LTE release 8, a TTI corresponds to one subframe (SF) of a length of 1 millisecond. One such 1 ms TTI is constructed by using 14 Orthogonal Frequency Division Multiple Access (OFDM) or Single Carrier-Frequency Division Multiple Access (SC-FDMA) symbols in the case of normal cyclic prefix and 12 OFDM or SC-FDMA symbols in the case of extended cyclic prefix. In LTE release 13, a study item has started during 2015, with the goal of specifying transmissions with shorter TTIs that are much shorter than the LTE release 8 TTI.

The shorter TTIs can be decided to have any duration in time and comprise resources on a number of OFDM or SC-FDMA symbols within a 1 ms SF. As one example, the duration of the short TTI may be 0.5 ms, i.e. seven OFDM or SC-FDMA symbols for the case with normal cyclic prefix. As another example, the duration of the short TTI may be 2 symbols.

Uplink Scheduling Grants

The existing physical layer downlink control channels, Physical Downlink Control Channel (PDCCH) and enhanced PDCCH (ePDCCH), are used to carry Downlink Control Information (DCI) such as scheduling decisions and power control commands. Both PDCCH and ePDCCH are transmitted once per 1 ms SF.

There are currently a number of different Downlink Control Information (DCI) formats, see 3GPP TS 36.212, for uplink and downlink resource assignments. Uplink scheduling grants use either DCI format 0 or DCI format 4. The latter is added in Release 10 for supporting uplink spatial multiplexing.

In general, the DCI for an uplink scheduling grant may contain
  Resource allocation information
    Carrier indicator
    Resource allocation type
    Resource block allocation
  RS and data related information
    modulation and coding scheme (MCS)
    New data indicator
    Cyclic shift of the uplink demodulation reference signals (DMRS)
    Precoding information
    Transmit power control
  Other information
    Sounding Reference Signal (SRS) request
    Channel Status Information (CSI) request
    Uplink (UL) index (for time division duplex (TDD))
    DCI format 0/1A indication (only in DCI format 0 and 1A)
    Padding
    Cyclic redundancy check (CRC) scrambled with Radio Network Temporary Identifier (RNTI) of the terminal Dynamic Switching Between Lengths of Short TTIs As mentioned, one way to reduce latency is to reduce the TTI, and instead of assigning resources with a time duration of 1 ms, there is then a need to assign resources with shorter duration such as a number of OFDM or SC-FDMA symbols. This implies a need for User Equipment (UE) specific control signaling that enables indication of such short scheduling assignments.

Furthermore, there is also a need to be able to dynamically switch between TII duration, for example between legacy 1 ms TTIs as well as shorter TTIs, in order to optimize the spectral efficiency (since shorter TTIs may incur higher overhead and/or worse demodulation performance).

Throughout this application, short PDSCH (sPDSCH) and short PUSCH (sPUSCH) are used to denote the downlink and uplink physical shared channels with short TTIs, respectively. Similarly, short PDCCH (sPDCCH) is used to denote downlink physical control channels with short TTIs (sTTIs), an sTTI having a shorter duration than a TTI.

In uplink transmissions, one or more SC-FDMA symbols with DMRS transmitted for each short TTI leads to an increased overhead and a corresponding decrease in data rates, when the length of the TTI is reduced.

SUMMARY

The existing way of operation, e.g. frame structure and control signaling, are designed for fixed length 1 ms data allocations, which may vary only in allocated bandwidth. Specifically, the current DCIs define resource allocations within the entire SF. There is no obvious solution that allows dynamic configuration of the short TTI duration for uplink transmissions.

A new DCI format can be defined to support short TTI configuration by introducing a time domain split field. However, this new DCI formatted is designed based on using PDCCH, which is transmitted only once per subframe. Therefore, short TTI scheduling decisions can only be made per subframe.

Flexible DMRS for short TTI transmissions in uplink can be enabled by introducing a separate DMRS grant and data grant for each sPUSCH. This method allows for flexible and fast reconfiguration of sPUSCH, and it enables UE to transmit DMRS without transmitting user data. However, separating DMRS and data grants increases the control signaling overhead. Moreover, it increases the complexity for handling of corner cases, where different types of grants are not correctly detected by the user.

To overcome the drawbacks of previous solutions a fast grant is possible which enables flexible configuration of sPUSCH, by indicating the positions and lengths of both DMRS and data symbols, as well as the length of the short TTI.

The uplink fast grants allow for flexible configuration of short TTIs for uplink transmissions, e.g., flexible TTI lengths within a subframe and to adjust TTI lengths for individual UE needs. However, it also adds more signaling overhead and an advanced hybrid automatic repeat request (HARQ) design. When the signaling overhead and the implementation complexity is a concern, a simplified uplink grant should be designed while still supporting promising uplink short TTI transmission functionalities, e.g., DMRS multiplexing and dynamic DMRS insertion.

Other signaling methods for uplink short TTI transmissions are possible. The uplink short TTI configurations, e.g., the positions of reference symbols in the form of DMRSs and data symbols, and the length of each TTI are fixed for each SF. The short TTI configuration is signaled by a slow grant, which is transmitted on SF basis in downlink, and it is possibly common for a group of users. An uplink short TTI transmission is scheduled by a fast grant, which is user specific and transmitted on symbol basis in downlink. The proposed solution supports uplink short TTI transmissions with a much lower signaling overhead and implementation complexity.

One drawback of this signaling method is the limited flexibility for the configuration sPUSCH transmission, due to the fact that the short TTI (sTTI) configuration is signaled by a slow grant.

An object of the disclosure is to solve, or at least mitigate, some of these problems in the art, and thus to provide an improved method performed by an RBS of scheduling resources for a wireless communication device.

This object is attained in a first aspect of the disclosure by a method performed at a Radio Base Station (RBS) of scheduling resources for a wireless communication device. The method comprises indicating and/or issuing a grant of a resource for the wireless communication device to transmit or receive data based on Downlink Control Information (DCI) and a position of the DCI within a data frame of a downlink control channel.

This object is attained in a second aspect of the disclosure by an RBS configured to schedule resources for a wireless communication device, the RBS comprising a processing unit and a memory, the memory containing instructions executable by the processing unit, whereby the RBS is operative to indicate and/or issue a grant of a resource for the wireless communication device (103) to transmit or receive data based on Downlink Control Information, DCI, and a position of the DCI within a data frame of a downlink control channel.

This object is attained in a third aspect of the disclosure by a method performed at a wireless communication device of being granted data transmission or data reception. The method comprises receiving a data frame of a downlink control channel from an RBS, and determining whether a granted resource of transmission or reception of data is issued and/or indicated based on DCI and a position of the DCI within a data frame of a downlink control channel.

This object is attained in a fourth aspect of the disclosure by a wireless communication device configured to determine whether data transmission or data reception is granted, comprising a processing circuit and a memory, the memory containing instructions executable by the processing circuit, whereby the wireless communication device is operative to receive a data frame of a downlink control channel from an RBS, and determine whether a granted resource of transmission or reception of data is issued and/or indicated based on DCI and a position of the DCI within the data frame of the downlink control channel.

In one alternative, one or more particular DCI bit fields at a particular position in the data frame indicates particular information to be sent in the uplink for the wireless communication device (also referred to herein as a UE). For instance, DCI bit field "00" at DL sTTI 0 may indicate a DMRS followed by two symbols of data, while DCI bit field "01" at DL sTTI 3 indicates one symbol of data followed by a DMRS, and so on.

Further, a DCI transmitted at a particular sTTI in the downlink, grants a UL transmission at a predetermined number of sTTIs from the particular sTTI at which the DCI was transmitted.

That is, a UL grant transmitted in the form of DCI data at sTTI n in the downlink schedules an UL transmission at sTTI n+k. For instance, one subframe may consist of 6 sTTIs in both UL and DL, if the UL scheduling timing is n+k with k=6, then, an UL grant transmitted at DL sTTI index=0 in a subframe schedules an UL transmission at UL sTTI index 0 in the next subframe.

As can be concluded, the DCI and the position of the DCI within a data frame of a downlink control channel indicates the DMRS configuration, the data symbol configuration, and the sTTI length of a corresponding data frame for uplink transmission (or downlink reception) of the UE.

In an embodiment, a new method for signalling transmissions, especially for the transmissions with shortened TTI length, is provided. The uplink transmission is signalled by an UL DCI, such as a fast DCI, which is transmitted on symbol basis in a DL sTTI. A field in the UL DCI together with the position of the DCI indicate the configuration of the scheduled uplink user data transmission, including the DMRS configuration, the data configuration, and the sTTI length. Similarly, a field in a fast DCI together with the position of the DCI may be used to indicate the configuration of uplink control channel transmission for the HARQ-ACK feedback for a DL transmission.

The same methodology can be used for signalling downlink short TTI transmissions.

Advantageously, the proposed solution supports uplink short TTI transmissions with a much lower signalling overhead and implementation complexity.

Further advantageous is that, the proposed solution enables dynamic configurations of uplink sTTI transmissions on a symbol basis. At the same time, it supports most of sTTI patterns.

The proposed solution further advantageously supports fixed or different TTI lengths within a subframe, DMRS multiplexing and dynamic DMRS insertion functionalities, which can reduce the DMRS overhead and thus improve the resource utilization for uplink short TII transmissions.

Thus, a new uplink grant approach for dynamic signalling of uplink short TTI configurations in which the position of the DCI in DL, in combination with a few control information bits constituting the DCI, is used for indicating UL sTTI length, DMRS positions, and data symbols positions for control and data channels.

In an embodiment, the RBS detects a need of the wireless communication device to perform an uplink transmission or downlink reception.

In an embodiment, the RBS selects time interval for transmitting the data frame on the downlink control channel to the wireless communication device.

In a further embodiment, the RBS configures one or more bit fields of the DCI to indicate to the wireless communication device that transmission or reception of data is granted.

In yet a further embodiment, the bit fields of the DCI indicate TTI configuration for the indicated grant.

In still a further embodiment, the grant is indicated and/or issued if the bit fields of the DCI are appropriately configured and the DCI is in an appropriate position within the data frame of the downlink control channel, as determined by the RBS.

In another embodiment, the RBS transmits data to, or receives data from, the wireless communication device upon the indication and/or issuing of a grant.

In an embodiment, the RBS includes in the DCI a Demodulation Reference Signal, DMRS.

In still an embodiment, the position of the DCI within a data frame of a downlink control channel is indicated by means of a downlink sTTI index.

In another embodiment, the RBS determines amount of resources granted to the wireless communication device and timing of transmission or reception of data.

In yet an embodiment, the DCI and the position of the DCI within a data frame of a downlink control channel indicates the DMRS configuration, the data symbol configuration, and the short TTI length of a corresponding data frame for uplink transmission or downlink reception of the wireless communication device.

In a fifth aspect, a computer program is provided comprising computer-executable instructions for causing a wireless communication device to perform steps of the method of the third aspect when the computer-executable instructions are executed on a processing circuit included in the wireless communication device.

In a sixth aspect, a computer program product is provided comprising a computer readable medium, the computer readable medium having the computer program according to the fifth aspect embodied thereon.

In a seventh aspect, a computer program is provided comprising computer-executable instructions for causing an RBS to perform steps of the method of the first aspect when the computer-executable instructions are executed on a processing circuit included in the RBS.

In an eighth aspect, a computer program product is provided comprising a computer readable medium, the computer readable medium having the computer program according to the seventh aspect embodied thereon.

Generally, all terms used are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The disclosure is now described, by way of example, with reference to the accompanying drawings, in which:

FIG. 2 illustrates an exemplifying embodiment of a 2-symbol DL sTTI configuration in a subframe;

FIG. 3 illustrates an exemplifying embodiment of the mapping between the bit field of a fast UL DCI sent from a DL sTTI and the configuration of the scheduled sPUSCH. Only sTTI lengths of 2, 3 and 7 symbols are supported for sPUSCH;

FIG. 8 illustrates an exemplifying embodiment of the mapping between the bit field of a fast UL DCI send from a DL sTTI and the configuration of the scheduled sPUSCH. sTTI lengths of 2, 4, and 7 symbols are supported for uplink sTTI transmissions;

FIG. 14 illustrates an exemplifying embodiment of the mapping between the bit field of a fast DL DCI send from a DL sTTI and the configuration of the scheduled sPUCCH. sTTI lengths of 2, 4, and 7 symbols are supported for uplink sPUCCH transmissions;

DETAILED DESCRIPTION

Embodiments will now be described more fully hereinafter with reference to the accompanying drawings, in which certain embodiments are shown. Embodiments in many different forms are envisaged and should not be construed as limited to the embodiments set forth herein; rather, these embodiments are provided by way of example so that this disclosure will be thorough and complete, and will fully convey the scope to those skilled in the art. Like numbers refer to like elements throughout the description.

As previously has been mentioned, in uplink transmissions, one or more SC-FDMA symbols with DMRS transmitted for each short TTI leads to an increased overhead and a corresponding decrease in data rates, when the length of the TTI is reduced.

To reduce the overhead, the reference signals from several transmitters may be multiplexed into the same SC-FDMA symbol while the user data from different transmitters are transmitted in separate SC-FDMA symbols.

Further, downlink short sPDSCH may not necessarily contain DMRS if recent DMRS transmissions to the same UE have occurred. The presence of DMRS in a downlink short TTI is either signalled in the sPDCCH or the UE attempts to blindly decode the transmission under the two assumptions that DMRS is present or not. This dynamic DMRS insertion can be also applied to sPUSCH for uplink transmissions within short TTIs.

Moreover, the DCI for an uplink grant may be divided into two parts, that is, a slow grant and a fast grant. The slow grant contains frequency resource allocation information. This grant is transmitted on SF basis in downlink, and it is common for a group of users. The fast grant is user specific, and it is transmitted on symbol basis in downlink. Dynamic configuration of the short TII duration for an uplink transmission is performed based on the information conveyed in the fast grant.

Figure 1:
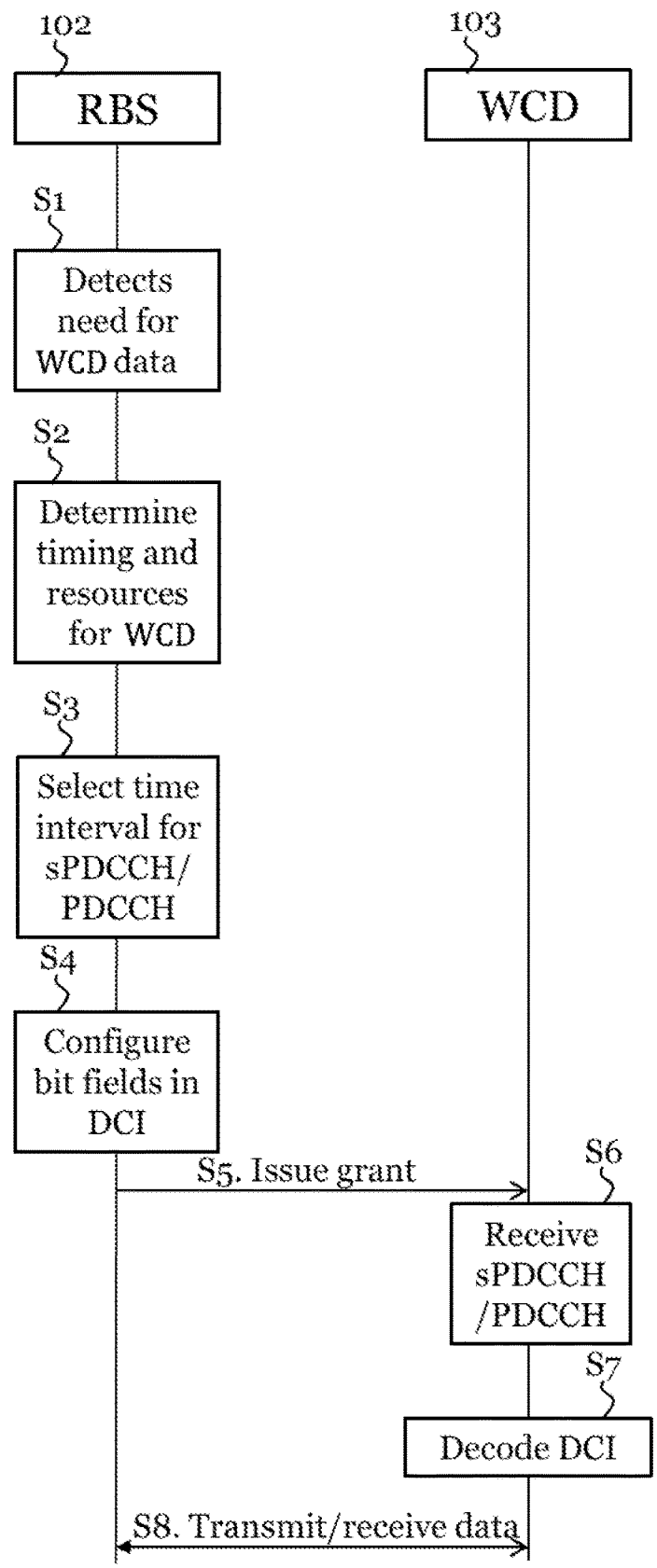
FIG. 1 illustrates a flowchart of a proposed signalling method to support uplink short TTI transmissions according to an embodiment.

A signalling method is proposed to support uplink short TTI transmissions according to an embodiment. This method will be described in the following with reference to the flowchart of FIG. 1, where RBS 102 denotes a Radio Base Station while WCD 103 denotes a wireless communication device, General Signalling Procedure Radio Base Station:

S1. Optionally detects need for data for a wireless communication device 103, e.g. the Radio Base Station 102 detects that there is a need for the wireless communication device 103 to receive data in the downlink, or transmit data in the uplink, for instance by receiving data intended for the wireless communication device 103 or by receiving a transmission request from the wireless communication device 103, S2. Optionally decides upon time and amount of resources for communication with the wireless communication device 103 including DMRS (Demodulation Reference Signal), S3. Optionally selects time interval for transmitting downlink control channel, e.g. a particular downlink sTTI index is selected where DCI is transmitted, S4. Determines bit fields in DCI (Downlink Control Information, e.g. a fast DCI), S5. Transmits downlink control channel containing DCI (e.g. a fast DCI), e.g. the Radio Base Station 102 indicates and/or issues a grant for the wireless communication device 103 to transmit or receive data based on DCI and a position of the DCI within a data frame of the downlink control channel, and S8. Optionally, transmit (or receive) data to (or from) wireless communication device 103 in accordance with the indicated and/or issued grant.

Wireless Communication Device:

S6. Receive and decode downlink control channel, e.g. decode received DCI,

S7. Determine configuration including DMRS for communication based on DCI and position of decoded control channel, and S8. Optionally, transmit (or receive) data to (or from) RBS 102 based on the indicated and/or issued grant.

Hence, the bit fields of the DCI and the position of the DCI indicates the particular TTI configuration to be complied with for the data transmission/reception stipulated by the indicated and/or issued grant.

Mapping of the Bitfield in a DCI to the Configuration for Transmissions

In an embodiment, the mapping of the field in a DCI to the configuration for a transmission is defined based on a latency optimized approach, such that the time duration between a received DCI and the corresponding transmission is as short as possible. This approach may result in a need for supporting more DCI configurations in some DL TTIs as compared to the other DL TTIs. Here, a lower limit of this time duration may depend on processing capacity in the UE.

In another embodiment, the mapping of the field in a DCI to the configuration for a transmission is defined based on a load balanced approach, such that the number of supported configurations for a transmission is equally distributed among different DL TTIs, and the number of bits required for the signalling is minimized.

In one embodiment, shorter TTIs have a shorter uplink scheduling timing (time between a received DCI and the corresponding uplink transmission) as compared to longer sTTIs. For example, a 2/3-symbol sTTI has a shorter uplink scheduling timing as compared to 7-symbol sTTI. In one embodiment, sTTIs with a reference signal in the first OFDM/SC-FDMA symbol have a shorter uplink scheduling timing (time between a received DCI and the corresponding uplink transmission) as compared to sTTIs with the same length, but with user data in the first OFDM symbol of the sTTI. For example, a 3-symbol sTTI configured with DMRS transmitted in the first symbol, and data transmitted in second and third symbols of the sTTI has a shorter uplink scheduling timing as compared to a 3-symbol sTTI configured with DMRS transmitted in the last symbol, and data transmitted in the first two-symbols of the sTTI.

As is understood, downlink (DL) transmissions are performed by a Radio Base Station (RBS) to a wireless communication device, such as a smart phone, a tablet, a smart watch, a gaming console, a television set, etc. This is commonly referred as a User Equipment. In LTE, the RBS is referred to as an evolved NodeB (eNodeB) and for 5G gNodeB. Accordingly, uplink (UL) transmissions are performed by the wireless communication device to the RBS.

In an embodiment, an uplink data resource is scheduled by an UL fast DCI, which is transmitted on symbol basis (or on every second or more symbol) in a DL short TTI. A field in the UL fast DCI together with the index of the DL sTTI where the UL fast DCI is transmitted indicate the configuration of the scheduled uplink sTTI transmission, including the DMRS configuration, the data symbol configuration, and the short TTI length.

In an embodiment, a resource for uplink control channel transmission is scheduled by a DL fast DCI, which is transmitted on symbol basis (or on every second or more symbol) in DL. A field in the DCI, such as a DL fast DCI, together with the position where the DCI, such as a DL fast DCI, is transmitted to indicate the configuration of the scheduled uplink control channel transmission, including the DMRS configuration, the data symbol configuration, and/or the TTI length.

In the following, exemplifying embodiment are described on how to signal grants for uplink data channel transmissions and uplink control channel transmissions with shortened TTI lengths.

Mapping of the Bit Field in a DCI to the Configuration for Uplink Data Channel Transmissions In an embodiment, the mapping of the uplink sTTI configurations and the field signalled in an UL fast DCI is defined based on an approach for optimizing latency, such that the time duration between a received uplink DCI in a DL sTTI and the uplink transmitting in an UL sTTI is as short as possible. The time duration depends on processing capacity in the UE.

In another embodiment, the mapping of the uplink sTTI configurations and the field signalled in an UL fast DCI is defined based on the load balancing approach, such that the number of UL sTTI configurations is equally distributed among different DL sTTIs, and the number of bits required for the signalling is reduced.

For the case where the number of DL sTTIs and the number of UL sTTIs are the same within a subframe, the mapping solutions based on the optimized latency approach and the load balancing approach are the same. That is the mapping of the uplink sTTI configurations and the field signalled in an UL fast DCI is defined based on a fixed one-to-one mapping between the DL sTTI and the UL sTTI.

In one embodiment, shorter TTIs have a shorter time between grant and transmission as compared to longer TTIs.

In a further embodiment, TTIs with a reference signal in the first OFDM symbol have a shorter time between grant and transmission as compared to TTIs with the same length, but with user data in the first OFDM symbol of the TTI.

In the following, some exemplifying embodiments are given on how to configure the bit field mapping based on a load balanced approach.

These exemplifying embodiments are based on the following assumptions:

1. The 2/3-0s DL short TTI pattern is shown in FIG. 2, where the first three OFDM symbols are used for PDCCH ("0s" denoting OFDM symbols).

2. The minimum UL scheduling timing with UL grant in sTTI number N for sPUSCH transmissions is N+6 TTIs timing for an uplink short TTI of 20s, allowing for at least 9 to 10 0s processing (5 short TTI) between last 0s of grant and first 0s of UL transmission N+5 TTIs timing for an uplink short TTI of 40s, allowing for 160s processing (4 short TTI) between last 0s of grant and first 0s of UL transmission N+4 TTIs timing for an uplink short TTI of 70s, allowing for 210s processing (3 short TTI) between last 0s of grant and first 0s of UL transmission.

Thus, FIG. 2 shows a subframe where the particular TTI configuration to be complied with for the data transmission/reception of a wireless communication device as stipulated by the grant indicated and/or issued by a Radio Base Station is indicated by the bit fields of the DCI and the position of the DCI, e.g. the DL sTTI index.

Figure 3:
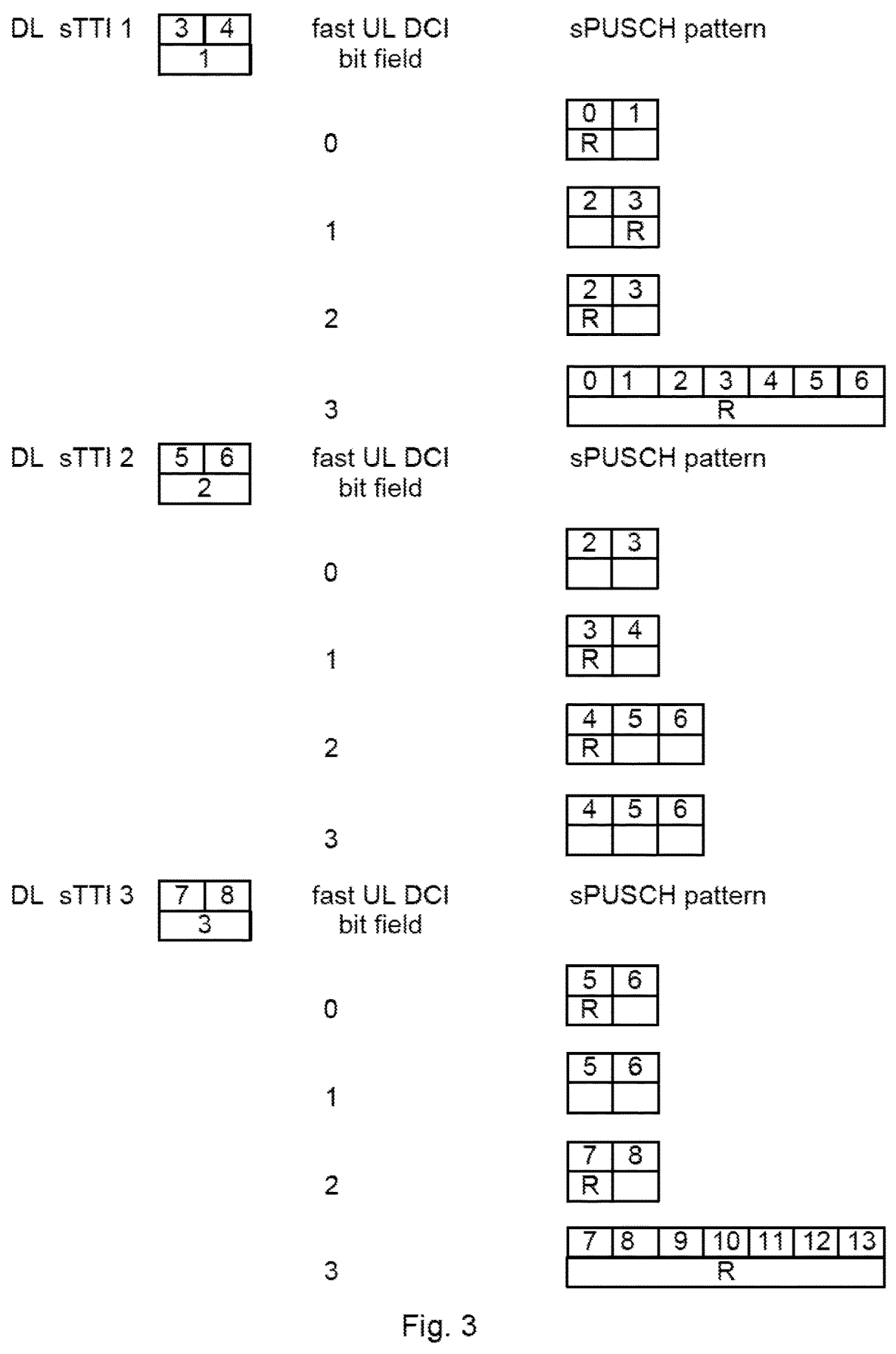

Dynamic Signalling of Uplink STTI Data Channel Transmissions of Length 2, 3 and 7 SC-FDMA Symbols A field of 2 bits in the UL fast DCI together with the DL sTTI index can be used for indicating different uplink short TTI configurations. An exemplifying embodiment of the bit field mapping is shown in FIG. 3. In this example, the first DL sTTI is not used for sending UL fast DCI.

As can be seen in FIG. 3, e.g. in the top left illustration, the actual position of the DCI within the subframe of the downlink in combination with a value of the DCI determines whether a grant will be indicated and/or issued to the wireless communication device to transmit UL data or receive DL data.

As can be seen, DL sTTI1 denotes a particular position of the DCI within the DL subframe, while the value of the DCI—i.e. the value expressed in the DCI bit field—denotes a particular configuration. In this particular embodiment, 4 different configurations (0-3) are possible.

Hence, a particular position (e.g. a particular DL sTTI index) of the DCI within the DL subframe in combination with a particular DCI value will represent a particular configuration. It may for instance be envisaged that a DCI having a value of "2" being transmitted with DL sTTI index="3" will represent an indicated and/or issued grant for the wireless communication device to transmit or receive data. In this particular example, DCI having a value of "2" being transmitted with DL sTTI index="3" indicates uplink transmission of a DMRS at UL sTTI index=7 and of data at UL sTTI index=8.

Throughout the figures, an uplink symbol indicated with "R" carries DMRS while blank symbols carry data.

As can be seen in FIG. 3, different sTTI lengths may also be indicated with DCI and its position. The previous example of DCI having a value of "2" being transmitted with DL sTTI index="3" indicates an sTTI length of two symbols, while DCI having a value of "3" being transmitted with DL sTTI index="3" indicates an sTTI length of seven symbols.

Hence, in an embodiment the DCI and the position of the DCI within a data frame of a downlink control channel indicates the DMRS configuration, the data symbol configuration, and the sTTI length of a corresponding data frame for uplink transmission of the wireless communication device.

Figure 4:
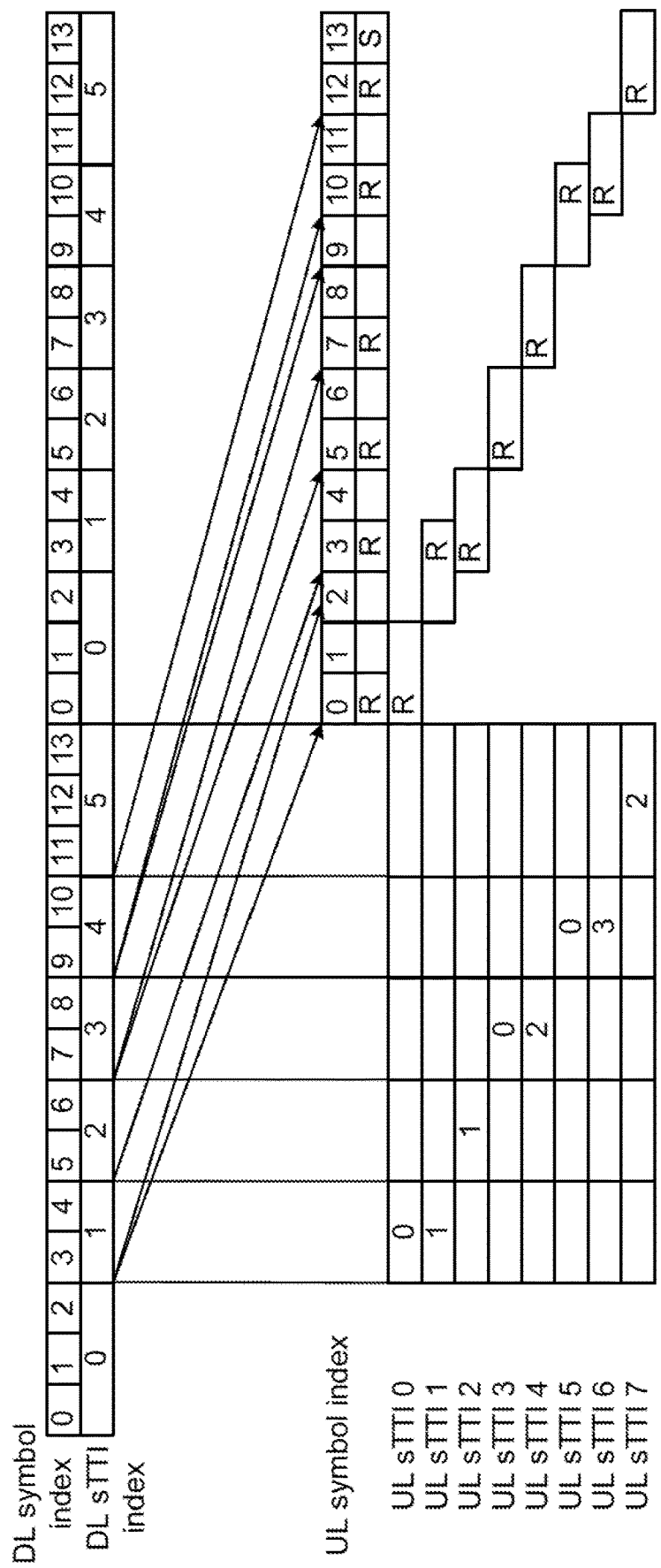
FIG. 4 illustrates an exemplifying embodiment of signalling eight 2-symbol sTTI configurations in a subframe with DMRS multiplexing/sharing, based on the UL fast DCI bit field mapping shown in FIG. 3.
Figure 4:
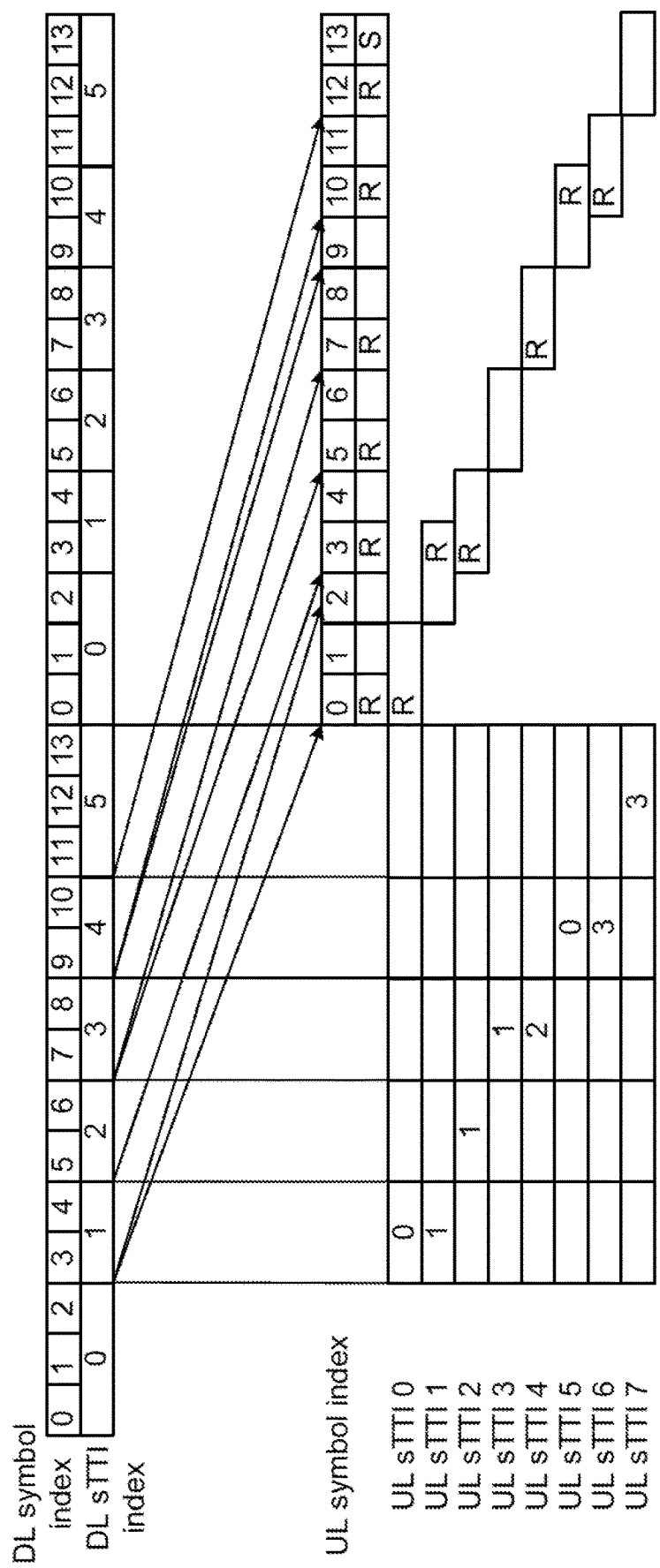

FIG. 4 illustrates an exemplifying embodiment of configuring eight 2-symbol uplink short TTI transmissions within a subframe, by using the UL fast DCI bit field mapping shown in FIG. 3. The arrows in FIG. 4 indicate the UL scheduling timings for different sPUSCH transmissions. The number(s) in the boxes below each DL sTTI is the value of the bit field used in the UL fast DCI(s) transmitted from this DL sTTI for signaling a sPUSCH transmission.

For example, two UL fast DCIs are transmitted from "DL sTTI index 1" with the bit field values set to 0 and 1, respectively. Then, based on the bit field mapping rule shown in FIG. 3, these two UL fast DCI will signal two uplink sTTI transmissions, e.g., UL sTTI 0 and UL sTTI 1 in FIG. 4. In FIG. 4 *a*), an UL fast DCI with the bit field value of 1 is transmitted from DL sTTI index 2, therefore, an uplink sTTI transmission is scheduled with configuration of transmitting DMRS at symbol index 5 and data at symbol index 6, i.e. "UL sTTI 2" shown in FIG. 4 *a*). It is also possible to support DMRS sharing between "UL sTTI 2" and "UL sTTI 3" as shown in FIG. 4 *b*), where the DMRS transmitted in "UL sTTI 2" is used for the channel estimate for the data transmitted in "UL sTTI 3". Thus, symbol 5 in "UL sTTI 3" is used for data transmission instead of DMRS. This DMRS sharing is enabled by transmitting an UL fast DCI with the bit field value of 1 from "DL sTTI index 3".

Figure 5:
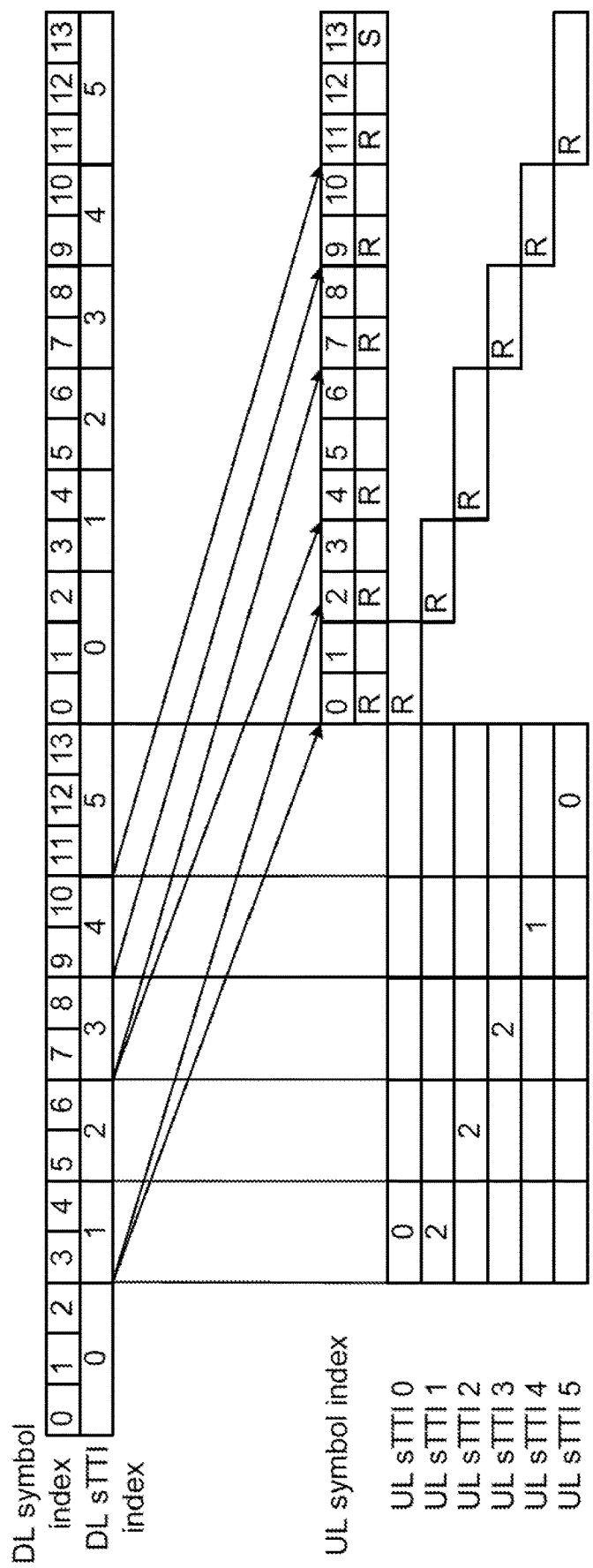
FIG. 5 illustrates an exemplifying embodiment of signaling six 2/3-symbol uplink sTTI configurations in a subframe without DMRS multiplexing/sharing, based on the UL fast DCI bit field mapping shown in FIG. 3.
Figure 6:
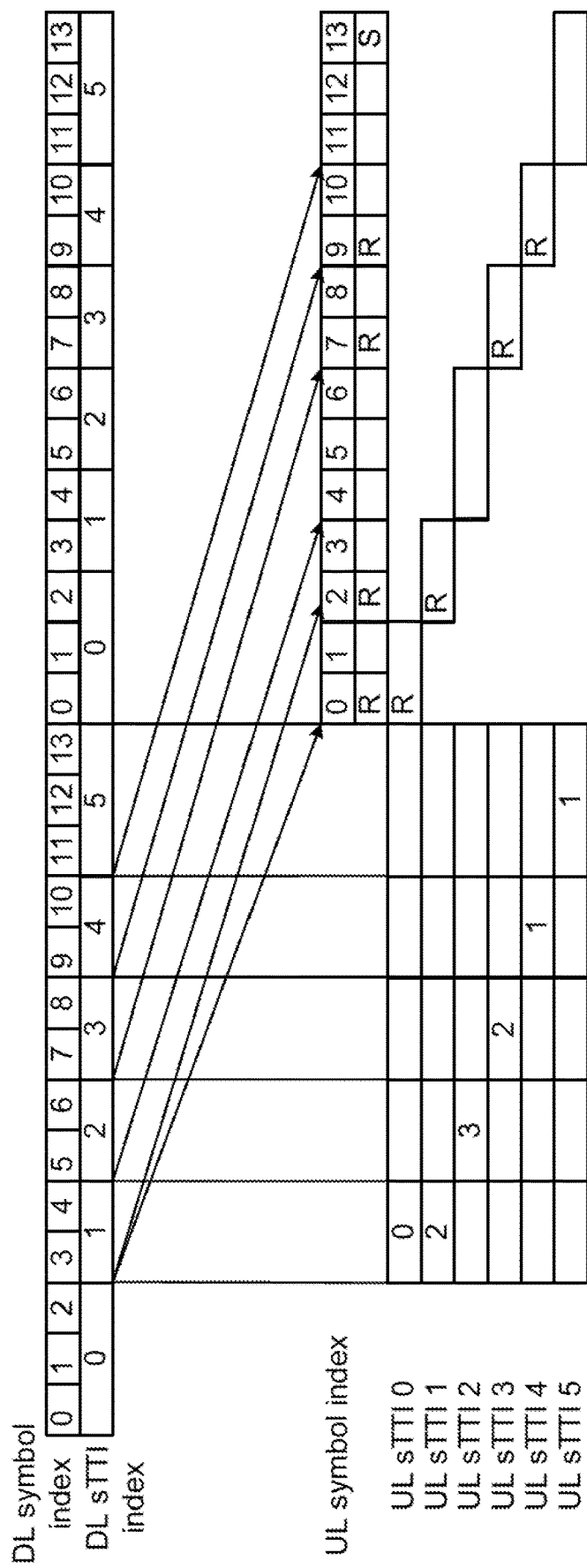
FIG. 6 illustrates an exemplifying embodiment of signaling six 2/3-symbol uplink sTTI configurations in a subframe with DMRS sharing, based on the UL fast DCI bit field mapping shown in FIG. 3.
Figure 6:
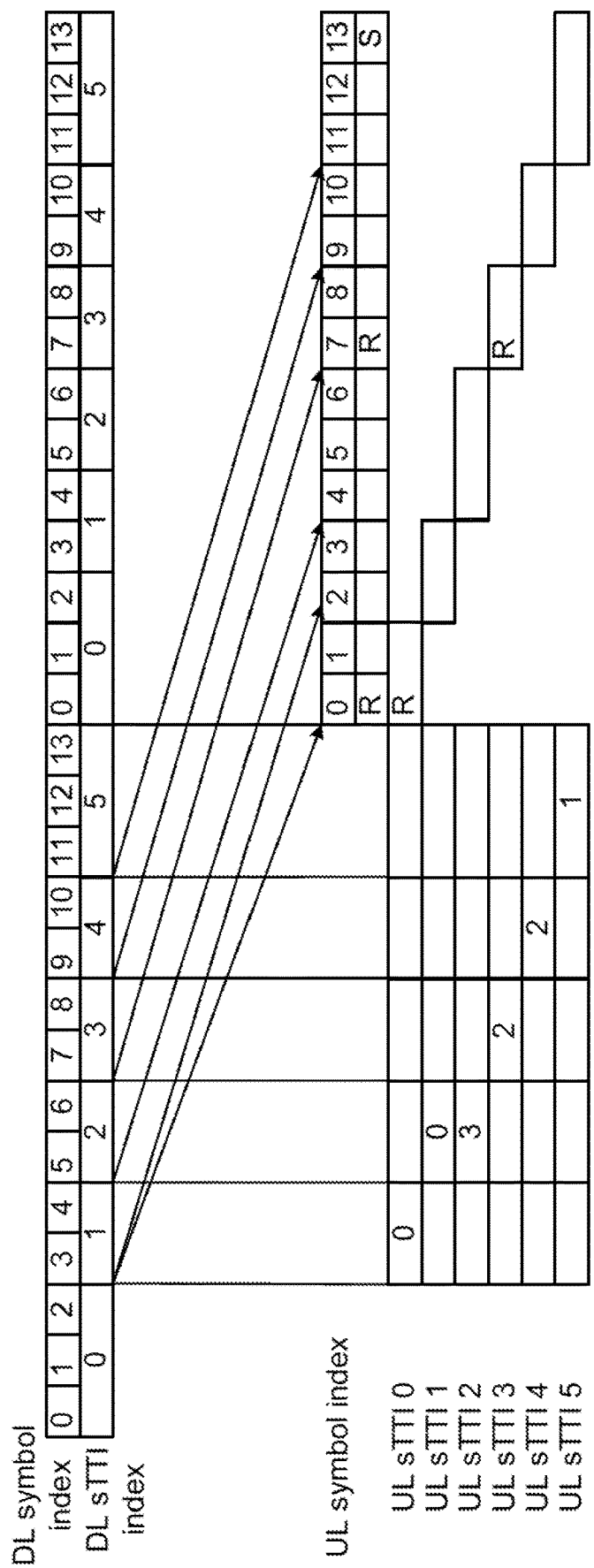

Different uplink short TTI transmissions can be dynamically configured by using a different combination of the UL fast DCIs transmitted from different DL sTTIs. FIG. 5 illustrates an exemplifying embodiment of configuring six 2 and 3 symbols uplink short TTI transmissions within a subframe without DMRS multiplexing or sharing. It is also possible to support DMRS sharing of consecutive sTTIs as shown in FIG. 6, where the DMRS is not transmitted in the second sTTI or the third sTTI of each slot.

Figure 7:
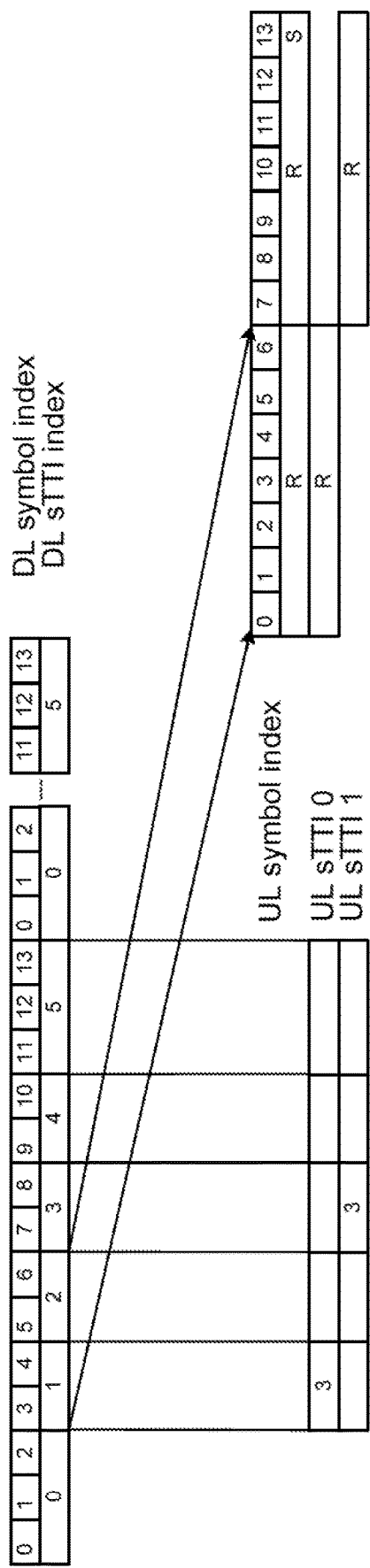
FIG. 7 illustrates an exemplifying embodiment of signaling 7-symbol uplink sTTI transmissions in a subframe, based on the UL fast DCI bit field mapping shown in FIG. 3.
Figure 9:
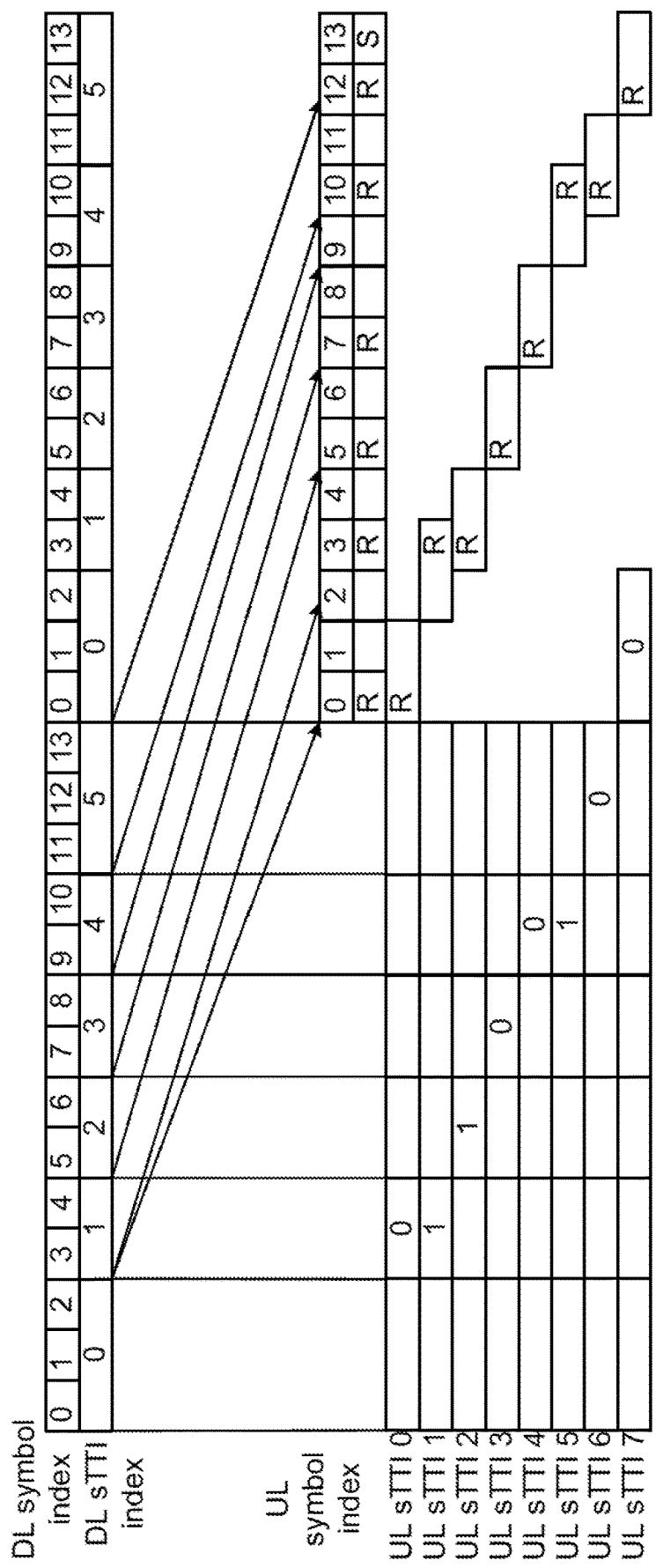
FIG. 9 illustrates an exemplifying embodiment of signaling eight 2-symbol uplink sTTI configurations in a subframe with DMRS multiplexing/sharing, based on the UL fast DCI bit field mapping shown in FIG. 8.
Figure 10:
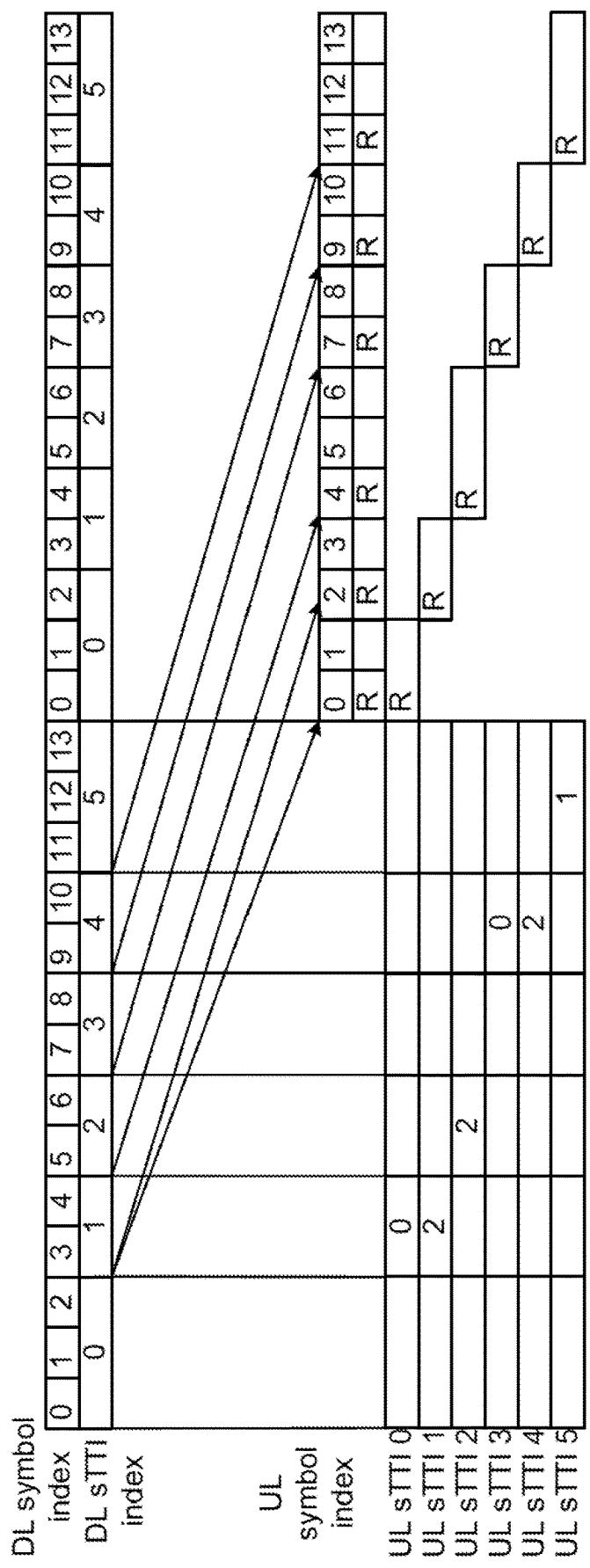
FIG. 10 illustrates an exemplifying embodiment of signaling six 2/3-symbolsTTI configurations in a subframe without DMRS multiplexing/sharing, based on the UL fast DCI bit field mapping shown in FIG. 8.
Figure 11:
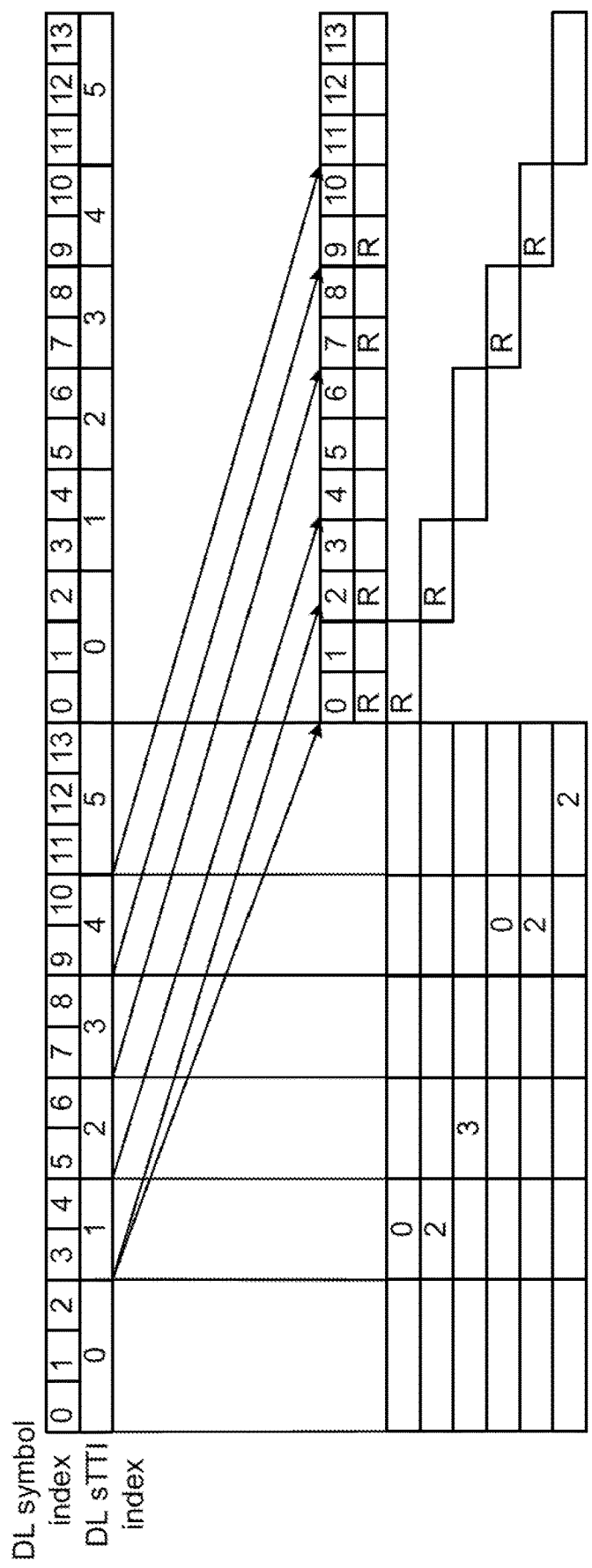
FIG. 11 illustrates an exemplifying embodiment of signaling six 2/3-symbol uplink sTTI configurations in a subframe with DMRS sharing, based on the UL fast DCI bit field mapping shown in FIG. 8.
Figure 11:
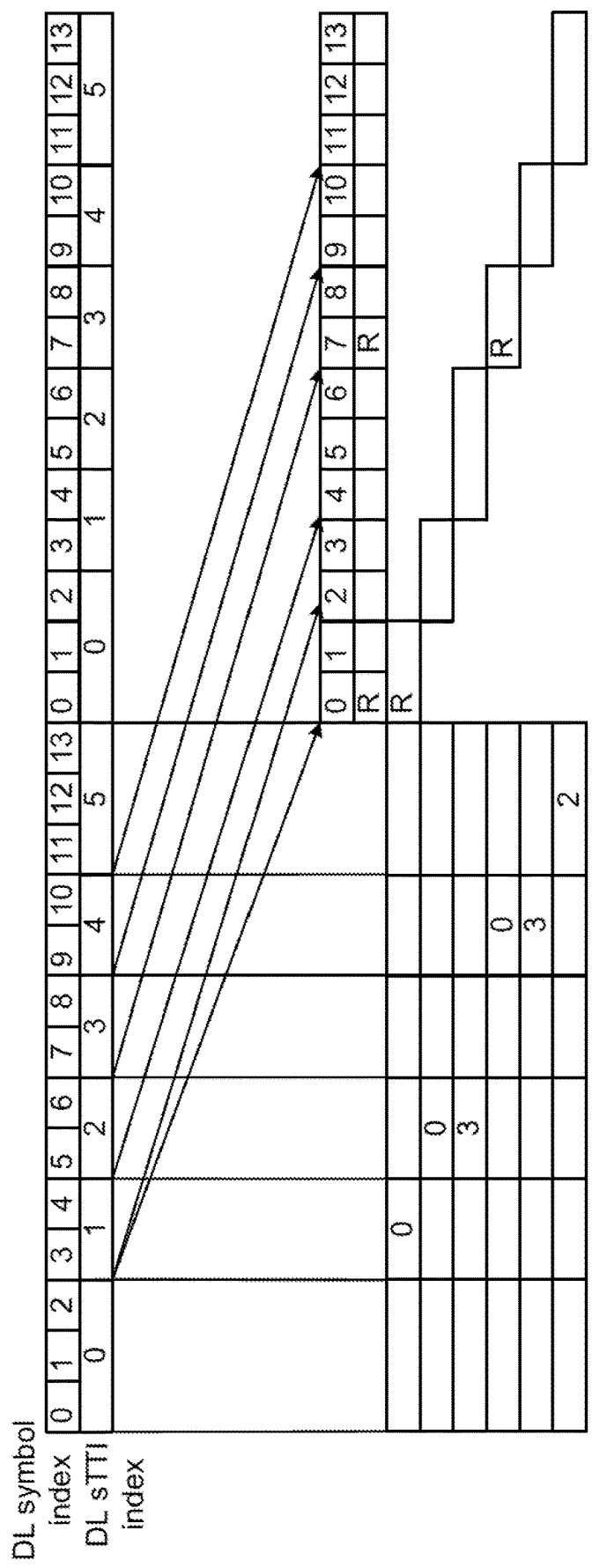

FIG. 7 illustrates an exemplifying embodiment of signalling two 7 0s sPUSCH transmissions within a subframe, by using the UL fast DCI mapping shown in FIG. 3.

For 2 symbols sTTIs, all or some UL DCI in one subframe are indicating UL grants in the subsequent sub-frame. Thus, no UL DCI is used for an UL grant in the same sub-frame. For 7 symbols sTTIs, the UL DCI in one sub-frame is always indicating an UL grant in the next-next sub-frame.

Dynamic Signalling of Uplink sTTI Data Channel Transmissions of Length 2, 3, 4 and 7 SC-FDMA Symbols If more UL sTTI configurations need to be supported, e.g. support of sTTI length of 4 symbols or support of other DMRS configurations of 2-symbol sTTI, then, either more bits need to be added in the field in the UL fast DCI, as compared to the 2 bits as described previously, or the first DL sTTI, which contains the PDCCH, need to be used for transmitting UL fast DCI In the following, exemplifying embodiments will be described on how to undertake signalling of uplink sTTI transmissions, when sTTI lengths of 2, 3, 4, and 7 symbols are supported.

Similar to previous embodiments, a field of 2 bits in the UL fast DCI together with the DL sTTI index can be used for indicating different uplink sTTI configurations. An exemplifying embodiment of the bit field mapping is shown in FIG. 8. Note that in this exemplifying embodiment, the first DL sTTI (which is allocated to PDCCH) is used for sending UL fast DCI.

In FIG. 9 to FIG. 13 illustrations are given of exemplifying embodiments of dynamically configuring uplink sTTI transmissions within a subframe for different sTTI lengths, by using the UL fast DCI bit field mapping shown in FIG. 8.

For 2 symbols sTTIs, most UL DCI in one subframe are indicating UL grants in the subsequent sub-frame. However, the DL DCI transmitted within the PDCCH might be used for UL grants within the same sub-frame, see illustration in FIG. 9. An alternative mapping might be defined such that all DL DCI indicate UL grants in the sub-frame after the sub-frame with the UL DCI.

Figure 12:
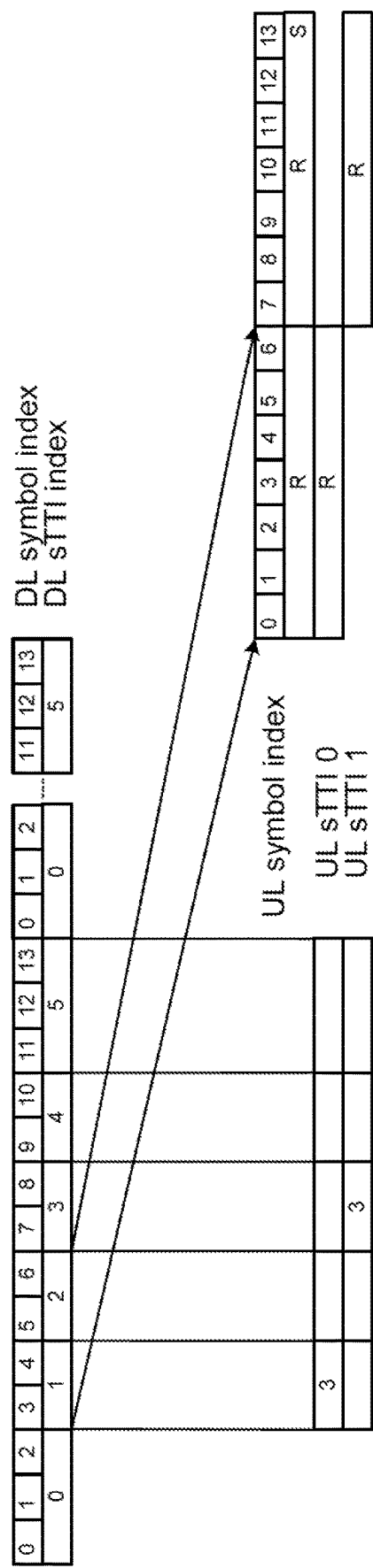
FIG. 12 illustrates an exemplifying embodiment of signaling 7-symbol uplink sTTI in a subframe, based on the UL fast DCI bit field mapping shown in FIG. 8.

For 7 symbols sTTIs, the UL DCI in one sub-frame is always indicating an UL grant in the next-next sub-frame per FIG. 12.

Figure 13:
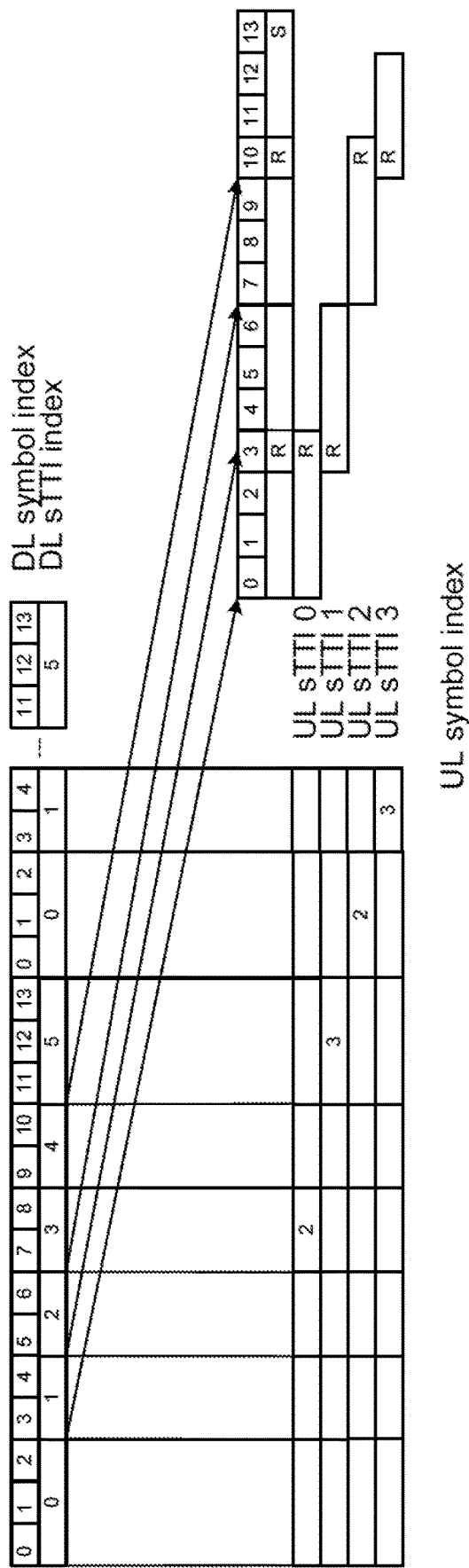
FIG. 13 illustrates an exemplifying embodiment of signaling 4-symbol uplink sTTI in a subframe, based on the UL fast DCI bit field mapping shown in FIG. 8.

For 4 symbols sTIIs, the UL DCI in one sub-frame is always indicating an UL grant in the next sub-frame per FIG. 13.

Dynamic Signalling of Uplink sTTI Control Channel Transmissions

Previously, it has been discussed how to dynamically signal uplink data channel configurations in short TIs. In the following, exemplifying embodiments will be described on how to dynamically signal short uplink control channel (sPUCCH) configurations in short TTIs. Since HARQ for DL data is transmitted in the uplink control channel, the indication of such channel should be in the fast DL DCI.

Figure 15:
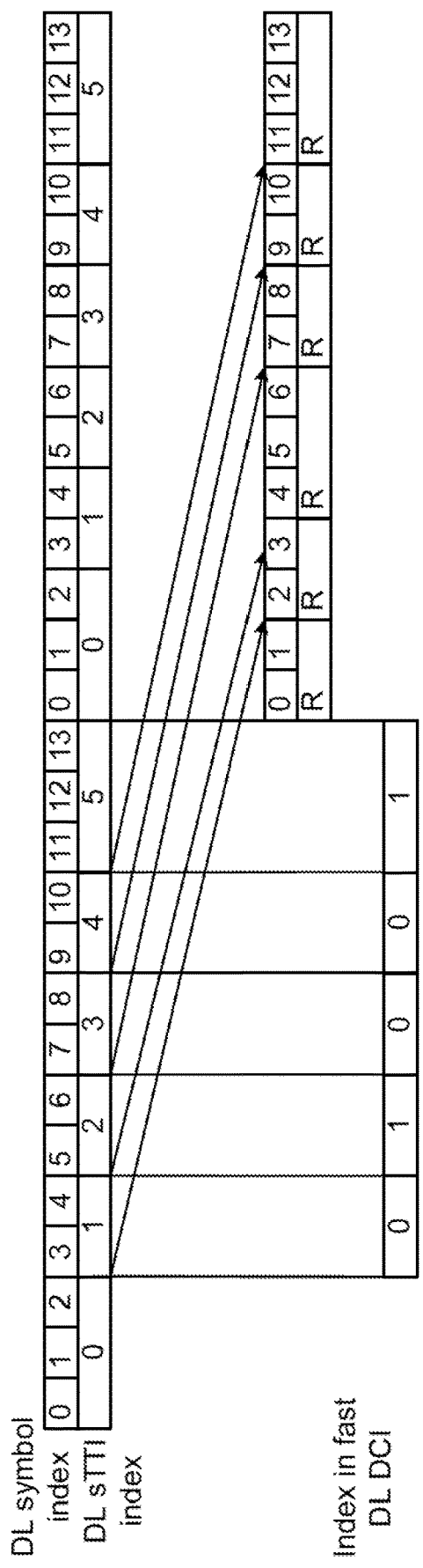
FIG. 15 illustrates an exemplifying embodiment of signaling usage of 2, 3, 4, and 7-symbols sPUCCH sTTI in a subframe, based on the DL fast DCI bit field mapping shown in FIG. 14.
Figure 15:
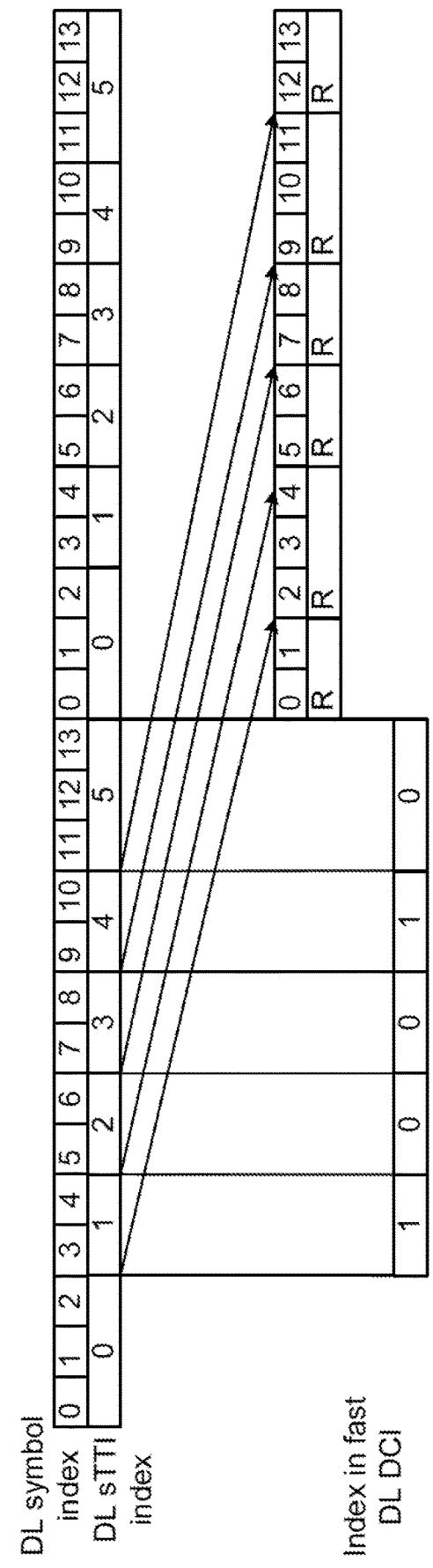
Figure 15:
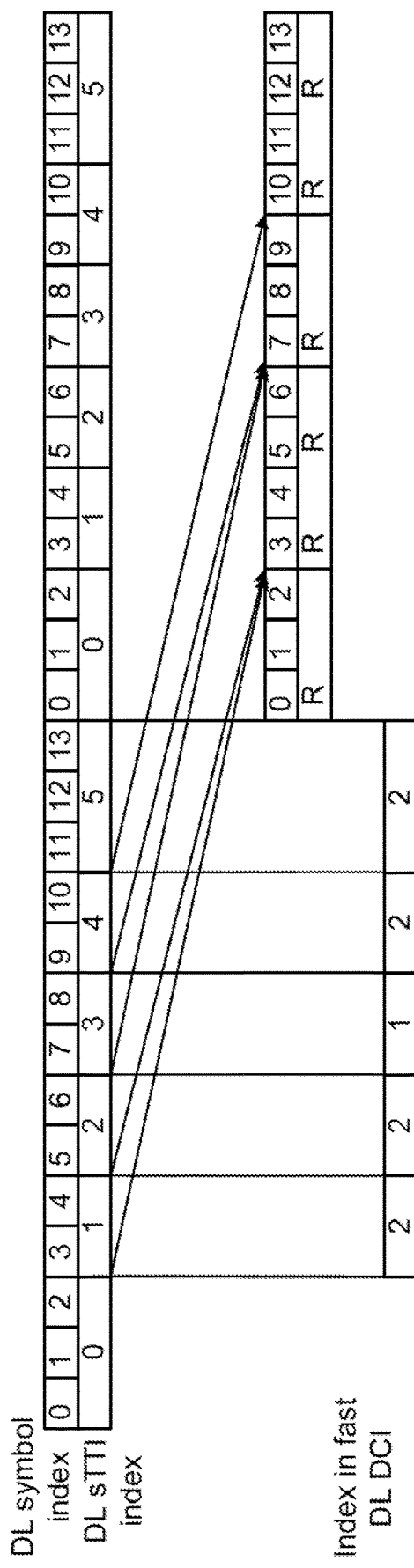
Figure 15:
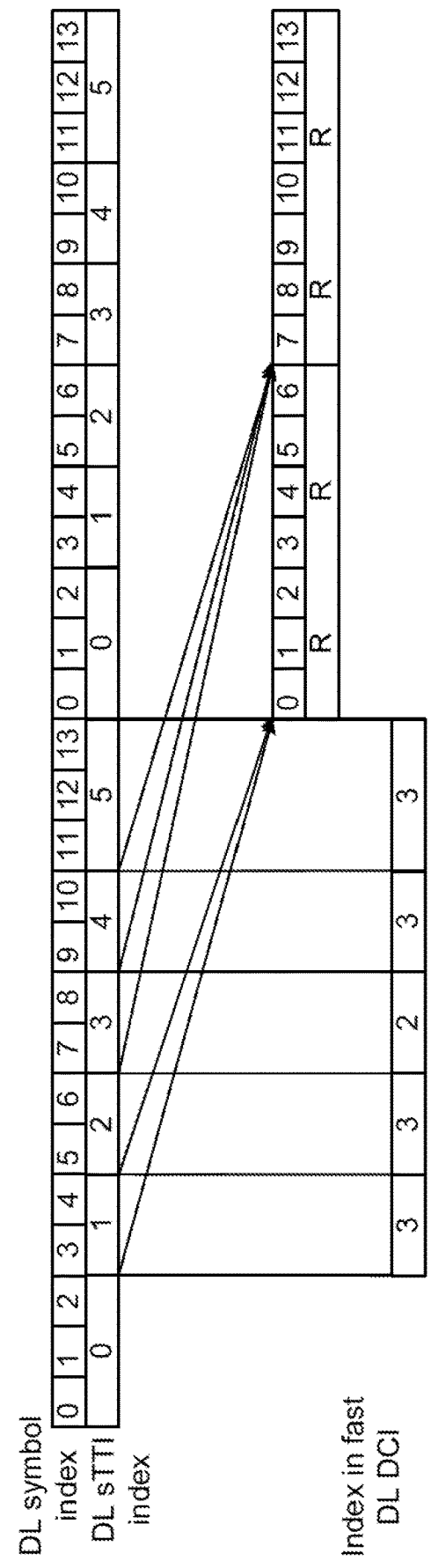

By defining 2 bits in the fast DL DCI, the UE can be instructed to send the DCI on 4 different sPUCCH options per DL sTTI location, similar to the fast UL DCI for sPUSCH, see example in FIG. 14. This way, up to 4 different sPUCCH patterns are supported for the DL sTTI pattern. An example of this is shown in FIG. 15, where the sPUCCH TTI signalled in the fast DL DCI are combined into 4 different sPUCCH patterns.

The above exemplifying embodiments can be modified by also including a fast DL DCI with sPUCCH configuration index for 14-symbol (legacy) length, for instance by removing the 4-symbol configurations. This can be used to ensure good coverage of the sPUCCH.

In an embodiment, a downlink transmission is scheduled by a DL fast DCI, which is transmitted on symbol basis (or on every second or more symbol) in DL. A field in the DL fast DCI together with the position where the DL fast DCI is transmitted indicate the configuration of the scheduled downlink transmission, including the DMRS configuration, the data symbol configuration, and/or the TTI length.

The same methodology proposed for mapping the field of DCI to the configuration of an uplink transmission can be used for DL transmissions as well.

Slot-Length and TDD Usage

In the case operation with 7-symbol (i.e. slot-length) DL TTI, the UL TTI should also be 7-symbol (slot-length). Therefore, there is no need to indicate a specific sPUSCH or sPUCCH configuration. The 2 bits defined in the fast DL and UL DCI to indicate the UL transmissions as described in the previous sections may still be defined also for the fast DCI in the slot-length DL TTI.

In one embodiment, the 2 bits in the DL and UL DCI are used to indicate a legacy length (14-symbol) TTI in UL for sPUSCH and sPUCCH, when the DL sTTI length is 7 symbols.

In yet another embodiment, when the DL TTI length is 7-symbols (slot-length), different configurations for the 14-symbol UL TTI is signaled using the 2 bits in fast DL and UL DCI. These configurations can be e.g. n+2 or n+3 timing as compared to n+4 timing. As one example, a first index is used to indicate slot-length UL, a second index to signal 14-symbol UL with n+4 timing, a third index to signal 14-symbol UL with n+3 timing, and a fourth index to signal 14-symbol UL with n+2 timing.

However, in TDD with slot-length operation in UL and DL, there may be a need to indicate which in a set of future UL TTI is scheduled with the fast UL DCI. In one embodiment, the 2 bits in the fast UL DCI defined in the sections above are reused for this purpose. In another embodiment, the 2 bits in the fast DL DCI are reused for transmitting the Downlink Assignment Index (DAI).

Figure 16A:
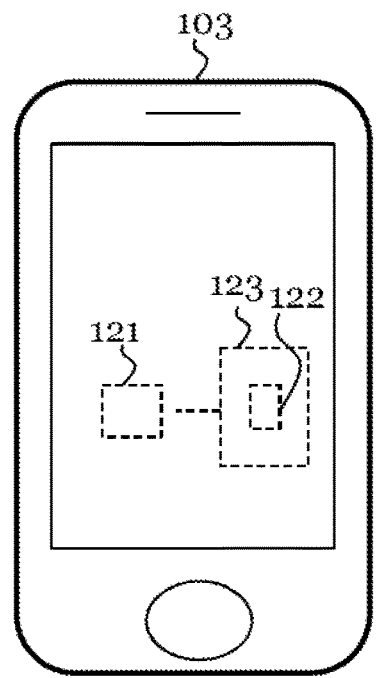
FIG. 16a illustrates a wireless communication device according to an embodiment.
Figure 16B:
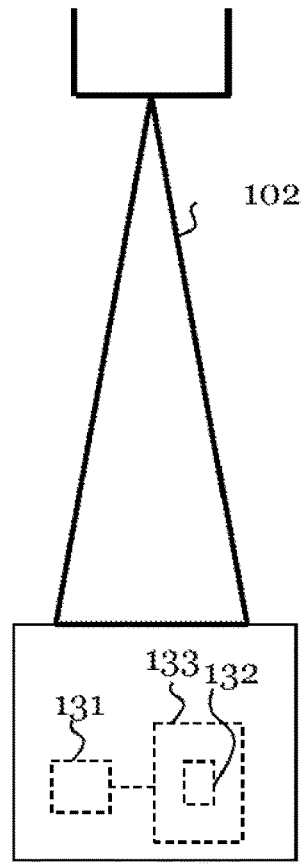
FIG. 16b illustrates an RBS according to an embodiment.

FIG. 16a illustrates a wireless communication device 103 (referred to as a UE in the following) according to an embodiment, while FIG. 16b illustrates an RBS 102 according to an embodiment.

Actions performed by the UE 103 according to embodiments may be performed by a processing circuit 121 embodied in the form of one or more microprocessors arranged to execute a computer program 122 downloaded to the storage medium 123 associated with the microprocessor, such as a Random Access Memory (RAM), a Flash memory or a hard disk drive.

The processing circuit 121 is arranged to cause the wireless communication device 103 to carry out actions according to embodiments when the appropriate computer program 122 comprising computer-executable instructions is downloaded to the storage medium 123 and executed by the processing circuit 121. The storage medium 123 may also be a computer program product comprising the computer program 122. Alternatively, the computer program 122 may be transferred to the storage medium 123 by means of a suitable computer program product, such as a Digital Versatile Disc (DVD) or a memory stick. As a further alternative, the computer program 122 may be downloaded to the storage medium 123 over a network. The processing circuit 121 may alternatively be embodied in the form of a digital signal processor (DSP), an application specific integrated circuit (ASIC), a field-programmable gate array (FPGA), a complex programmable logic device (CPLD), etc.

Actions performed by RBS 102 of FIG. 16b according to embodiments may be performed by a processing circuit 131 embodied in the form of one or more microprocessors arranged to execute a computer program 132 downloaded to the storage medium 133 associated with the microprocessor, such as a Random Access Memory (RAM), a Flash memory or a hard disk drive. The processing circuit 131 is arranged to cause the RBS 102 to carry out actions according to embodiments when the appropriate computer program 132 comprising computer-executable instructions is downloaded to the storage medium 133 and executed by the processing circuit 131. The storage medium 133 may also be a computer program product comprising the computer program 132. Alternatively, the computer program 132 may be transferred to the storage medium 133 by means of a suitable computer program product, such as a Digital Versatile Disc (DVD) or a memory stick. As a further alternative, the computer program 132 may be downloaded to the storage medium 133 over a network. The processing circuit 131 may alternatively be embodied in the form of a digital signal processor (DSP), an application specific integrated circuit (ASIC), a field-programmable gate array (FPGA), a complex programmable logic device (CPLD), etc.

In an embodiment, an RBS configured to schedule resources for a wireless communication device is provided. The RBS is further configured to indicate and/or issued a granted resource for the wireless communication device to transmit or received data based on Downlink Control Information (DCI) and a position of the DCI within a data frame of a downlink control channel.

The RBS thus comprises means for indicating and/or issuing a grant for the wireless communication device to transmit or received data based on Downlink Control Information (DCI) and a position of the DCI within a data frame of a downlink control channel.

In an embodiment, the RBS comprises a processing circuit and a memory, the memory containing instructions executable by the processing circuit, whereby the RBS is operative to indicate and/or issue a granted resource for the wireless communication device to transmit or received data based on Downlink Control Information (DCI) and a position of the DCI within a data frame of a downlink control channel.

In a further embodiment, a wireless communication device is provided. The wireless communication device is configured to receive a data frame of a downlink control channel from an RBS, and determine a granted resource of transmission or reception of data is indicated and/or issued based on Downlink Control Information (DCI) and a position of the DCI within a data frame of a downlink control channel.

The wireless communication device thus comprises means for receiving a data frame of a downlink control channel from an RBS, and means for determining whether a granted resource of transmission or reception of data is indicated and/or issued based on Downlink Control Information (DCI) and a position of the DCI within a data frame of a downlink control channel.

In a further embodiment, the wireless communication device comprises a processing circuit and a memory, the memory containing instructions executable by the processing circuit, whereby the wireless communication device is operative to receive a data frame of a downlink control channel from an RBS, and to determine whether a granted resource of transmission or reception of data is indicated and/or issued based on Downlink Control Information (DCI) and a position of the DCI within a data frame of a downlink control channel.

The disclosure has mainly been described above with reference to a few embodiments. However, as is readily appreciated by a person skilled in the art, other embodiments than the ones disclosed above are equally possible within the scope of the disclosure, as defined by the appended patent claims.

The invention claimed is:

1. A method performed at a Radio Base Station, RBS, configured to grant data reception on a downlink shared channel for a wireless communication device, the method comprising:
   transmitting a resource allocation for the data reception on the downlink shared channel based on a bitfield of Downlink Control Information, DCI, and a position of the DCI within a subframe of a downlink control channel.

2. The method of claim 1, further comprising:
   detecting a need of the wireless communication device to perform one of an uplink transmission and a downlink reception to transmit the resource allocation.

3. The method of claim 1, further comprising:
selecting a time interval for transmitting the subframe on the downlink control channel to the wireless communication device.

4. The method of claim 1, further comprising:
one of transmitting data to, and receiving data from, the wireless communication device after transmitting the resource allocation.

5. The method of claim 1, further comprising:
signalling, in the DCI, a second position of a Demodulation Reference Signal, DMRS, to be transmitted at uplink transmission.

6. The method of claim 1, wherein the position is indicated by a downlink short Transmission Time Interval, sTTI, index number at which the DCI is transmitted.

7. The method of claim 1, wherein the first position is usable by the wireless communication device to determine a scheduling of a granted uplink resource.

8. The method of claim 1, wherein the DCI and the position indicates a DMRS configuration, a data symbol configuration, and a short TTI length of a corresponding data frame for one of uplink transmission and downlink reception of the wireless communication device.

9. A method performed at a wireless communication device being granted data reception on a downlink shared channel by a Radio Base Station, RBS, the method comprising:
determining a resource allocation for the data reception on the downlink shared channel based on a bitfield of Downlink Control Information, DCI, and a position of the DCI within a subframe of the downlink control channel.

10. The method of claim 9, further comprising:
one of transmitting data to, and receiving data from, the RBS using a resource associated with resource allocation.

11. The method of claim 9, further comprising:
determining, from the DCI, a position of a Demodulation Reference Signal, DMRS, to be transmitted at uplink transmission.

12. The method of claim 9, wherein the position is given by a downlink short Transmission Time Interval, sTTI, index number at which the DCI is transmitted.

13. The method of claim 9, further comprising:
determining a DMRS configuration, a data symbol configuration, and a short TTI length of a corresponding data frame for one of uplink transmission and downlink reception from the DCI and the first position.

14. The method of claim 9, further comprising:
determining a scheduling of a granted uplink resource from the position.

15. The method of claim 9, wherein for the DCI, a resource associated with the resource allocation is scheduled for uplink transmission at a predetermined number of short Transmission Time Intervals, sTTIs, from the sTTI in which the DCI is received.

16. A wireless communication device being granted data reception on a downlink shared channel by a Radio Base Station, RBS, the wireless communication device comprising a processing unit and a memory, the memory including instructions executable by the processing unit to configure the wireless communication device to:
determine a resource allocation for the data reception on the downlink shared channel based on a bitfield of Downlink Control Information, DCI, and a position of the DCI within a subframe of the downlink control channel.

17. The wireless communication device of claim 16, wherein the memory further includes instructions executable by the processing unit to configure the wireless communication device to:
determine, from the DCI, a position of a Demodulation Reference Signal, DMRS, to be transmitted at uplink transmission.

18. The wireless communication device of claim 16, wherein the position is given by a downlink short Transmission Time Interval, sTTI, index number at which the DCI is transmitted.

19. The wireless communication device of claim 16, wherein the memory further includes instructions executable by the processing unit to configure the wireless communication device to:
determine a DMRS configuration, a data symbol configuration, and a short TTI length of a corresponding data frame for one of uplink transmission and downlink reception from the DCI and the position.

20. The wireless communication device of claim 16, wherein the memory further includes instructions executable by the processing unit to configure the wireless communication device to:
determine a scheduling of a granted uplink resource from the position.

* * * * *